United States Patent
Yerramalli et al.

(10) Patent No.: US 10,855,355 B2
(45) Date of Patent: Dec. 1, 2020

(54) CHANNEL STATE INFORMATION REPORTING ENHANCEMENTS FOR UNLICENSED COORDINATED MULTIPOINT

(71) Applicant: QUALCOMM Incorporated, San Diego, CA (US)

(72) Inventors: Srinivas Yerramalli, San Diego, CA (US); Xiaoxia Zhang, San Diego, CA (US); Seyed Ali Akbar Fakoorian, San Diego, CA (US); Jing Sun, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/414,568

(22) Filed: May 16, 2019

(65) Prior Publication Data

US 2019/0363773 A1 Nov. 28, 2019

Related U.S. Application Data

(60) Provisional application No. 62/676,746, filed on May 25, 2018.

(51) Int. Cl.
*H04B 7/06* (2006.01)
*H04B 7/024* (2017.01)
*H04W 16/14* (2009.01)

(52) U.S. Cl.
CPC ........... *H04B 7/0626* (2013.01); *H04B 7/024* (2013.01); *H04W 16/14* (2013.01)

(58) Field of Classification Search
CPC .. H04B 7/0626; H04B 7/024; H04B 7/18528; H04B 7/18571; H04B 7/18576; H04W 16/14; H04W 84/06; H04L 27/0006; H04L 5/005; H04L 5/0057; H04L 5/0035; H04L 5/001
See application file for complete search history.

(56) References Cited

U.S. PATENT DOCUMENTS

| | | | |
|---|---|---|---|
| 2014/0334333 A1* | 11/2014 | Xu | H04W 72/0406 370/252 |
| 2016/0242052 A1* | 8/2016 | Kazmi | H04W 24/08 |
| 2018/0227106 A1 | 8/2018 | Kim et al. | |
| 2018/0269939 A1* | 9/2018 | Hu | H04W 74/006 |
| 2019/0109682 A1* | 4/2019 | Ahn | H04L 5/0035 |

FOREIGN PATENT DOCUMENTS

| WO | 2016036097 A1 | 3/2016 |
|---|---|---|
| WO | 2017171369 A2 | 10/2017 |

OTHER PUBLICATIONS

International Search Report and Written Opinion—PCT/US2019/032835—ISA/EPO—Aug. 21, 2019.

* cited by examiner

*Primary Examiner* — Sharad Rampuria
(74) *Attorney, Agent, or Firm* — Patterson + Sheridan, L.L.P.

(57) ABSTRACT

Techniques and apparatus for reporting channel state information (CSI) for unlicensed coordinated multipoint (CoMP) operations are provided. One technique includes determining, based on one or more conditions, for each of a plurality of base stations available for a coordinated multipoint (CoMP) transmission, whether the base station has transmitted a channel state information reference signal (CSI-RS) in unlicensed spectrum. CSI feedback is reported based on the determination.

20 Claims, 7 Drawing Sheets

CHANNEL STATE INFORMATION REPORTING ENHANCEMENTS FOR UNLICENSED COORDINATED MULTIPOINT

CROSS-REFERENCE TO RELATED APPLICATION

This application claims the benefit of and priority to U.S. Provisional Patent Application No. 62/676,746, filed May 25, 2018, which is assigned to the assignee hereof and hereby expressly incorporated by reference herein.

BACKGROUND

I. Field of the Disclosure

Aspects of the present disclosure relate to wireless communications, and more particularly, to techniques and apparatus for reporting channel state information (CSI) for unlicensed coordinated multipoint (CoMP) operations.

II. Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

As the demand for mobile broadband access continues to increase, using shared radio frequency spectrum, which may include unlicensed radio frequency spectrum, has been considered to help solve the spectrum congestion problem for future wireless needs, not only to meet the growing demand for mobile broadband access, but also to advance and enhance the user experience with mobile communications. However, the shared radio frequency spectrum may carry other transmissions, and therefore techniques such as listen before talk (LBT) and clear channel assessment (CCA) may be used in an effort prevent excessive interference. In certain scenarios, wireless devices operating in a shared spectrum may be asynchronous. It may be desirable to mitigate interference caused by wireless devices operating in the scared spectrum.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications in a wireless network.

Certain aspects provide a method for wireless communication by a user equipment (UE). The method generally includes determining, for each of a plurality of base stations available for a coordinated multipoint (CoMP) transmission, whether the base station has transmitted a channel state information reference signal (CSI-RS) in unlicensed spectrum, wherein the determination is based on one or more conditions. The method also includes reporting channel state information (CSI) feedback based on the determination.

Certain aspects provide an apparatus for wireless communication. The apparatus generally includes means for determining, for each of a plurality of base stations available for a coordinated multipoint (CoMP) transmission, whether the base station has transmitted a channel state information reference signal (CSI-RS) in unlicensed spectrum, wherein the determination is based on one or more conditions. The apparatus also includes means for reporting channel state information (CSI) feedback based on the determination.

Certain aspects provide an apparatus for wireless communication. The apparatus generally includes at least one processor, a transmitter, and a memory coupled to the at least one processor. The at least one processor is configured to determine, for each of a plurality of base stations available for a coordinated multipoint (CoMP) transmission, whether the base station has transmitted a channel state information reference signal (CSI-RS) in unlicensed spectrum, wherein the determination is based on one or more conditions. The transmitter is configured to report channel state information (CSI) feedback based on the determination.

Certain aspects provide a computer-readable medium for wireless communications by a user equipment (UE). The computer-readable medium generally includes computer executable code, which when executed by at least one processor, causes the UE to determine, for each of a plurality of base stations available for a coordinated multipoint (CoMP) transmission, whether the base station has transmitted a channel state information reference signal (CSI-RS) in unlicensed spectrum, wherein the determination is based on one or more conditions, and report channel state information (CSI) feedback based on the determination.

Certain aspects provide a method for wireless communication by a base station. The method generally includes determining, for each of a plurality of other base stations that are available to participate in a coordinated multipoint (CoMP) transmission with the base station, whether the other base station has transmitted a channel state information reference signal (CSI-RS) in unlicensed spectrum. The method also includes determining a channel state information (CSI) reporting configuration for a user equipment (UE) to use to report CSI, based on the determination of whether each of the other base stations has transmitted a CSI-RS in the unlicensed spectrum. The method further includes transmitting an indication of the CSI reporting configuration to the UE.

Certain aspects provide an apparatus for wireless communication. The apparatus generally includes means for determining, for each of a plurality of other base stations that are available to participate in a coordinated multipoint (CoMP) transmission with the base station, whether the other base station has transmitted a channel state information reference signal (CSI-RS) in unlicensed spectrum. The apparatus also includes means for determining a channel state information (CSI) reporting configuration for a user equipment (UE) to use to report CSI, based on the determination of whether each of the other base stations has transmitted a CSI-RS in the unlicensed spectrum. The apparatus further includes means for transmitting an indication of the CSI reporting configuration to the UE.

Certain aspects provide an apparatus for wireless communication. The apparatus generally includes at least one processor, a transmitter, and a memory coupled to the at least one processor. The at least one processor is configured to determine, for each of a plurality of base stations that are available to participate in a coordinated multipoint (CoMP) transmission with the apparatus, whether the base station has transmitted a channel state information reference signal (CSI-RS) in unlicensed spectrum. The at least one processor is also configured to determine a channel state information (CSI) reporting configuration for a user equipment (UE) to use to report CSI, based on the determination of whether each of the base stations has transmitted a CSI-RS in the unlicensed spectrum. The transmitter is configured to transmit an indication of the CSI reporting configuration to the UE.

Certain aspects provide a computer-readable medium for wireless communications by a user equipment (UE). The computer-readable medium generally includes computer executable code, which when executed by at least one processor, causes the UE to: determine, for each of a plurality of base stations that are available to participate in a coordinated multipoint (CoMP) transmission with the apparatus, whether the base station has transmitted a channel state information reference signal (CSI-RS) in unlicensed spectrum; determine a channel state information (CSI) reporting configuration for a user equipment (UE) to use to report CSI, based on the determination of whether each of the base stations has transmitted a CSI-RS in the unlicensed spectrum; and transmit an indication of the CSI reporting configuration to the UE.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
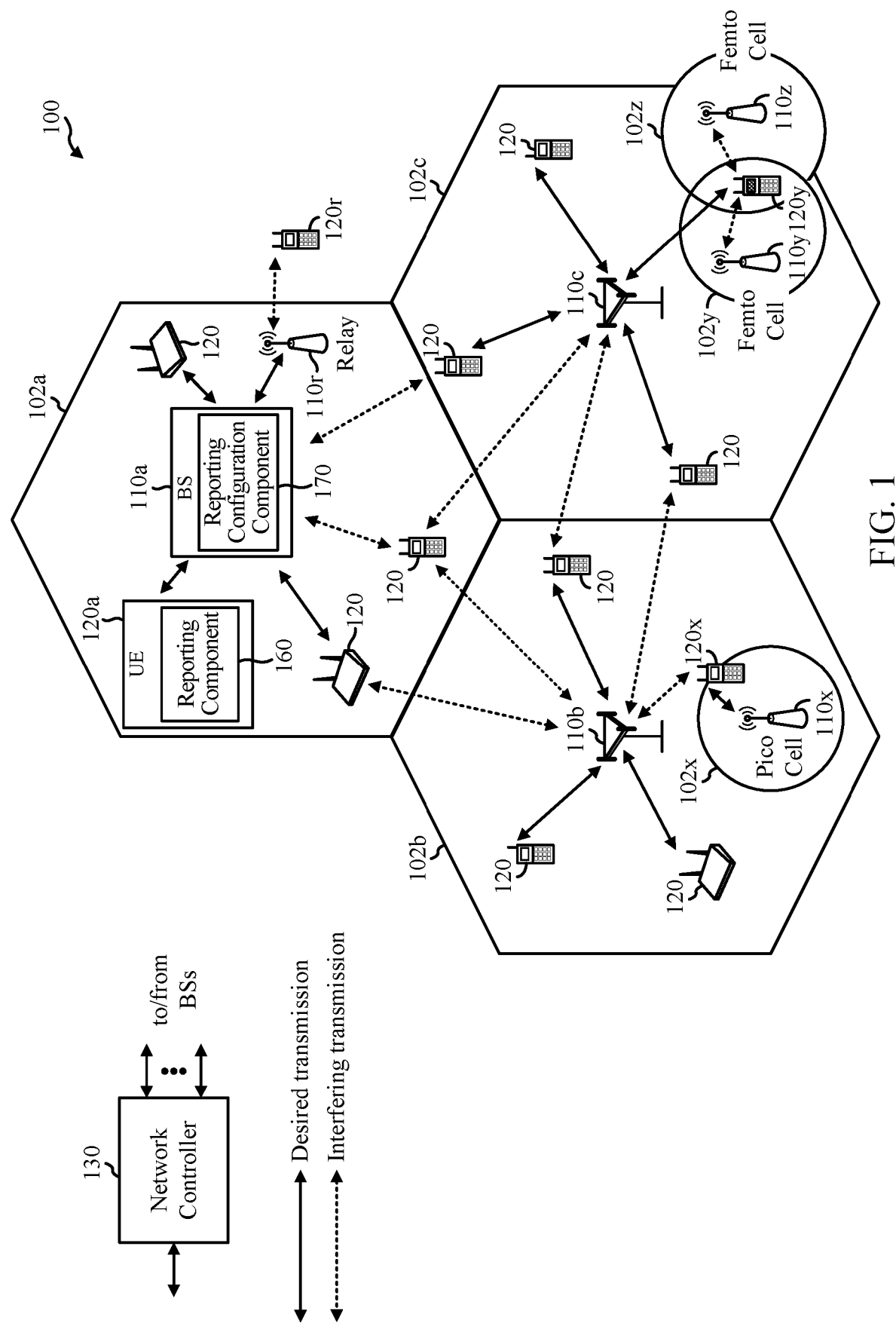
FIG. 1 is a block diagram conceptually illustrating an example telecommunications system, in accordance with certain aspects of the present disclosure.

Aspects of the present disclosure provide apparatus, methods, processing systems, and computer readable mediums for determining and/or reporting CSI for unlicensed CoMP operations.

CoMP operations enable dynamic coordination of transmission and/or reception by multiple different transmission reception points (TRPs), such as multiple base stations (BSs). CoMP may improve overall quality for the user, improve network utilization, provide enhanced reception performance, increase receive power, reduce interference, etc., enabling higher rates. Some systems (e.g., NR) may support CoMP operations in licensed spectrum and/or unlicensed spectrum.

In general, CoMP operations may rely on accurate CSI (e.g., determined by UEs and reported to the TRPs involved in the CoMP operation). NR, in general, supports different methods for obtaining CSI (e.g., for a CoMP operation). In some cases, the CSI for a CoMP operation may be based on downlink channel state information reference signals (CSI-RSs)-based reporting by the UE. For example, the gNB may configure multiple CSI-RS processes, and each CSI-RS may be transmitted from a different TRP/panel/gNB. In some cases, the CSI for a CoMP operation may be based on uplink sounding reference signals (SRSs)-based transmissions from the UE. For example, each UE may transmit one or more uplink SRS, which can be processed by multiple TRPs/panels/gNBs.

In the unlicensed spectrum, however, there may be uncertainty (e.g., at the UE(s)) regarding whether the TRPs/panels/gNBs successfully transmitted a reference signal (e.g., CSI-RS) used for obtaining CSI (e.g., for a CoMP operation). For example, in unlicensed spectrum, nodes typically have to perform an access procedure, such as listen before talk (LBT), etc., in order to gain access to the unlicensed spectrum to transmit reference signal(s). However, in situations where there is a LBT failure, such that the gNB(s) is unable to gain access to the unlicensed spectrum, the gNB(s) may not be able to transmit reference signals used for obtaining CSI. Accordingly, it may desirable to provide techniques that enable UEs to determine the success or failure of a gNB transmission (e.g., CSI-RS transmission), before further processing of CSI for a CoMP operation.

Aspects presented herein provide techniques for determining and/or reporting CSI for unlicensed CoMP operations. As described in more detail below, using the techniques presented herein, a UE may determine, for each of multiple base stations available for a CoMP transmission, whether the base station has successfully transmitted a CSI-RS in unlicensed spectrum, based on one or more conditions. The UE may report CSI feedback based on the determination. Further, in some aspects, the base station(s) (e.g., gNB(s)) participating in an CoMP transmission may configure the UE to send CSI based at least in part on whether the gNB(s) participating in the CoMP transmission have successfully transmitted a CSI-RS in unlicensed spectrum. Doing so enables the UE to determine and provide accurate CSI for the CoMP operation in the unlicensed spectrum.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2).

New Radio (NR) is an emerging wireless communications technology under development in conjunction with the 5G Technology Forum (SGTF). NR access (e.g., 5G NR) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mmMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

NR introduces the concept of network slicing. For example, a network may have multiple slices, which may support different services, for example, internet of everything (IoE), URLLC, eMBB, vehicle-to-vehicle (V2V) communications, etc. A slice may be defined as a complete logical network that comprises of a set of network functions and corresponding resources necessary to provide certain network capabilities and network characteristics.

The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

FIG. 1 illustrates an example wireless communication network 100, such as a NR or 5G network, in which aspects of the present disclosure may be performed, e.g., for determining and reporting CSI for unlicensed CoMP operations. As illustrated, a UE 120a includes a reporting component 160, which is configured to implement one or more techniques described herein for determining and reporting CSI for unlicensed CoMP operations. Using the reporting component 160, the UE 120a may determine, for each of the BS(s) 110 that are available for a CoMP transmission, based on one or more conditions, whether the BS 110 has successfully transmitted a CSI-RS in unlicensed spectrum and report CSI feedback based on the determination.

As also illustrated, a BS 110a includes a reporting configuration component 170, which is configured to implement one or more techniques described herein for configuring CSI reporting for UEs. Using the reporting configuration component 170, the BS 110a may determine whether other BSs that are available for a CoMP transmission have successfully transmitted a CSI-RS in unlicensed spectrum and configure one or more UEs to report CSI based on the determination.

As illustrated in FIG. 1, the wireless communication network 100 may include a number of BSs 110 and other network entities. A BS may be a station that communicates with user equipments (UEs). Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio base station (NR BS), 5G NB, access point (AP), or transmission reception point (TRP) may be used interchangeably. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC- FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
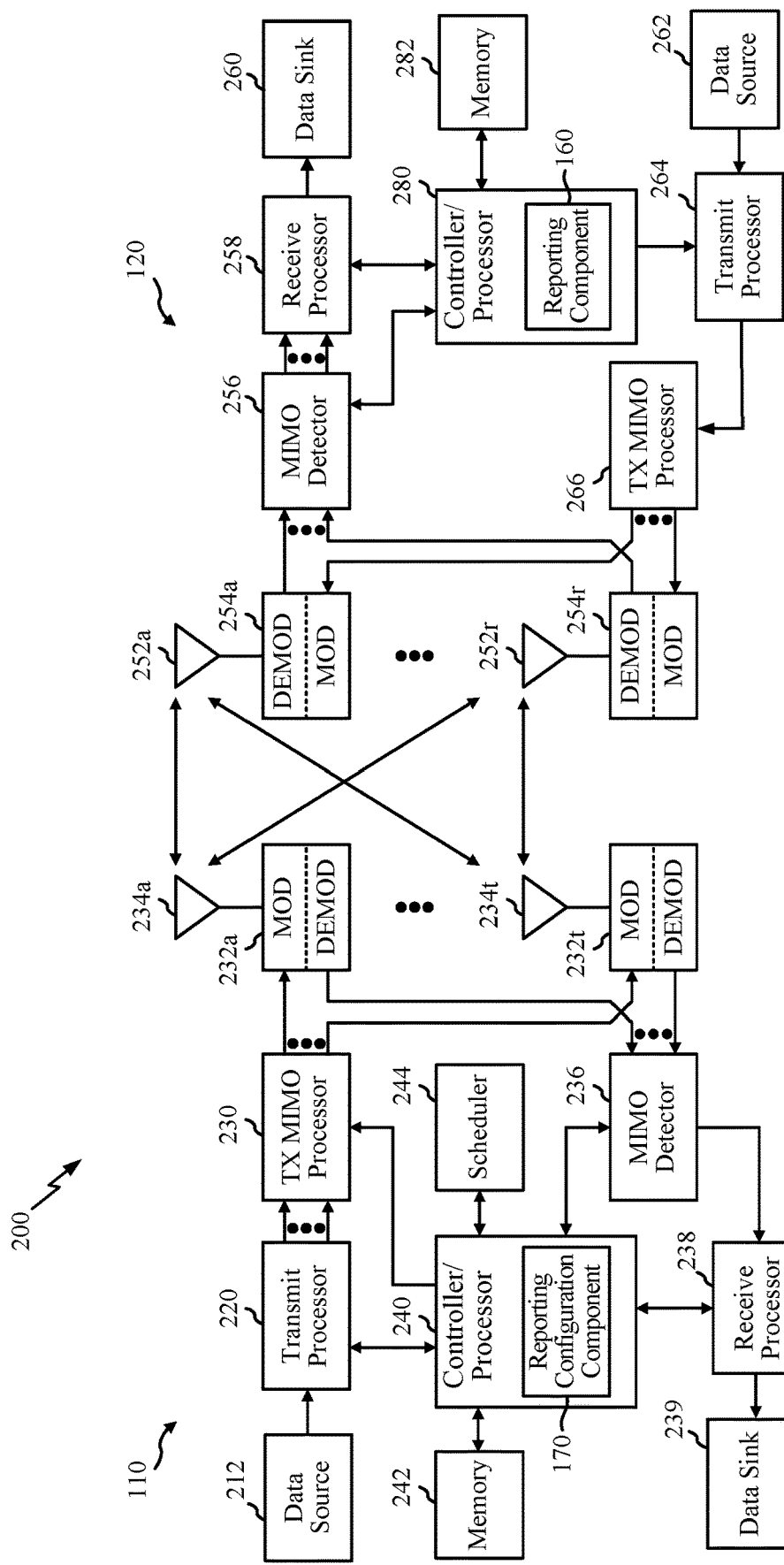
FIG. 2 is a block diagram conceptually illustrating a design of an example base station (BS) and user equipment (UE), in accordance with certain aspects of the present disclosure.

FIG. 2 illustrates example components of BS 110 and UE 120 (e.g., in the wireless communication network 100 of FIG. 1), which may be used to implement aspects of the present disclosure. For example, antennas 252, processors 266, 258, 264, and/or controller/processor 280 of the UE 120 and/or antennas 234, processors 220, 230, 238, and/or controller/processor 240 of the BS 110 may be used to perform the various techniques and methods described herein. As shown in FIG. 2, the controller/processor 240 of the BS 110 has a reporting configuration component 170 that may be used for configuring CSI reporting for UEs, according to aspects described herein. That is, the reporting configuration component 170 can indicate different reporting configurations for the UE to use for reporting CSI to BSs. Similarly, as shown in FIG. 2, the controller/processor 280 of the UE 120 has a reporting component 160 that may be configured for determining and reporting CSI for unlicensed CoMP operations, according to aspects described herein.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120, the antennas 252a-252r may receive the downlink signals from the BS 110 and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the base station 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The controllers/processors 240 and 280 may direct the operation at the BS 110 and the UE 120, respectively. The controller/processor 240 and/or other processors and modules at the BS 110 may perform or direct the execution of the functional blocks illustrated in FIG. 6, and/or various processes for the techniques described herein. The controller/processor 280 and/or other processors and modules at the UE 120 may perform or direct the execution of the functional blocks illustrated in FIG. 4, and/or various processes for the techniques described herein. The memories 242 and 282 may store data and program codes for BS 110 and UE 120, respectively. A scheduler 244 may schedule UEs for data transmission on the downlink and/or uplink.

In some aspects, the UE(s) 120 and BS(s) 110 in the wireless communication network 100 may communicate using a shared spectrum. Example deployment scenarios for a shared spectrum, which may include use of an unlicensed radio frequency spectrum, may include operator-based deployments, a stand-alone mode of operation, and/or a dual-connectivity mode of operation. In an operator-based deployment, multiple operators may share a same frequency band. A stand-alone mode of operation may include inter-public land mobile network (PLMN) handover from a licensed carrier. A dual-connectivity mode of operation may include connectivity to a shared spectrum component carrier and to an anchor carrier on licensed spectrum.

Medium access in an unlicensed spectrum may involve a dynamic listen before talk (LBT) procedure. Dynamic LBT procedures may allow sharing of network resources (e.g., frequency resources) on millisecond time scale. However, access to the medium may not be guaranteed, for example, in an asynchronous system. For asynchronous operation, the Node Bs (BSs) may have different frame timings, and transmissions from different Node Bs may not be aligned in time (e.g., one or more subframe and/or frame boundaries of different Node Bs may not be contemporaneously aligned).

A Wi-Fi asynchronous system design may be optimized for dynamic LBT procedures. In a Wi-Fi system, beacon transmissions (overhead signals, reference signals) may be subject to LBT. The periodic beacon signals may be "asynchronous" in nature. Beacon transmissions may not be transmitted frequently and receiving stations (STAs) may trigger asynchronous transmission of beacons in a Wi-Fi system.

STA-based mobility may be needed in an effort to compensate for poor radio resource management (RRM) due to, for example, the asynchronous nature of beacon transmissions. Data transmissions may each contain a preamble which may be used for synchronization and detection of the data burst.

To communicate in unlicensed spectrum, a network node (e.g., UE or BS) may perform a LBT procedure in order to win contention-based access to the unlicensed spectrum. The LBT procedure may refer to monitoring (listening) (e.g., by applying clear channel assessment (CCA)) to determine whether another network node is occupying the same (portion of) unlicensed spectrum before communicating (talking) on the unlicensed spectrum in order to avoid interference. A BS may perform a downlink LBT procedure before communicating on the downlink, while a UE may perform an uplink LBT procedure before communicating on the uplink. Examples of LBT procedures may include load based equipment (LBE)-based procedures and frame based equipment (FBE)-based procedures.

LBE generally defines a demand-driven timing frame for devices to apply CCA before using a channel (e.g., in unlicensed spectrum). For example, before starting transmissions on an operating channel, the device may perform a CCA check using energy detect (ED). The device may observe the channel for the duration of the CCA observation time. The operating channel may be considered occupied if the energy level in the channel exceeds the threshold corresponding to the power level. If the CCA procedure finds that the channel is clear, the device may transmit on the channel. If the CCA procedure finds that the channel is occupied, the device may not transmit in that channel, but may perform an extended CCA (ECCA) procedure in which the channel is observed for a random duration. If the ECCA procedure determines the channel is clear, the device may initiate transmissions on the channel.

FBE generally defines a fixed timing frame for channel access in unlicensed spectrum. For example, before starting transmissions on an operating channel, the device may perform a CCA check using ED, and observe the channel for the duration of the CCA observation time. The operating channel may be considered occupied if the energy level in the channel exceeds the threshold corresponding to the power level. If the CCA procedure finds that the channel is clear, the device may transmit and occupy the channel for a fixed time period. If the CCA procedure finds that the channel is occupied, the device may not transmit on that channel during the next fixed frame period. The total time during which the device has transmissions on a given channel without re-evaluating the availability of that channel may be defined as the Channel Occupancy Time (CoT). After occupying the channel for CoT, the device may keep silent and wait for a short time, referred to as an idle period. Toward the end of the idle period, the device may perform a new CCA procedure.

Compared to unlicensed spectrum, in some systems (e.g., 4G/LTE), medium access may be optimized for the licensed spectrum. Accordingly, "sensing" (e.g., monitoring or listening) to determine whether another network node is occupying a same RF band before communicating ("talking") on the RF band, in an effort to avoid interference, may not be required. Such systems instead use a periodic transmission of overhead signals. RRM procedures exploit the periodic transmission of these overhead signals. Measurement reporting may be utilized for network-controlled mobility that may take into consideration radio conditions and system loading.

Battery life of UEs may be prolonged using a discontinuous reception (DRX) procedure, whereby a UE discontinuously receives information. During a DRX period, a UE may power down most of its circuitry, thereby saving power.

NR may be optimized for licensed spectrum. While 4G/LTE may not support a fast on/off procedure, where a transmitter-BS may communicate with a wireless device, quickly stop using portions of the spectrum, and quickly reestablish communication, NR system designs may support this feature.

A shared spectrum may attempt to minimize changes from the operation of the NR licensed spectrum, in an effort to speed-up shared spectrum deployment. The shared spectrum may accommodate periodic transmissions of overhead and/or common channels. The shared spectrum may not make many changes to RRM and may exploit a fast on/off procedure. According to one example, a BS may communicate with a wireless device using a portion of the shared spectrum and may stop use of the shared spectrum, for example, to defer to a licensed transmitter. The BS may restart using the spectrum when the licensed transmitter stops use of spectrum resources.

Operation in a shared spectrum may include a network listen function at a Node B (BS). Deployments may protect overhead and/or common channels of other deployments. Stated otherwise, a node associated with a first spectrum and first operator may protect overhead and/or common channels transmitted by a node associated with a second spectrum and a second operator.

In a shared spectrum, the configuration used by other wireless devices may be learned by detecting and measuring a neighboring Node B's discovery reference signals (DRS) and/or broadcast channel (BCH). A BS, for example, can use its network listen function to determine whether another BS has successfully transmitted a discovery reference signal. A DRS may include, for example, PSS, SSS, CRS, and/or CSI-RS. The shared spectrum may not use an LBT procedure for overhead signals and/or common channels.

A UE, operating in a shared spectrum, may perform an LBT procedure in an effort to access non-protected resources.

A Spectrum Access System (SAS) may allocate channels within and across tiers. These tiers may include, in order of priority, (1) incumbent licensees; (2) Priority Access licensees (PALs); and (3) General Authorized Access (GAA) operators. A shared spectrum may complement SAS server functionality with over-the-air mechanisms for channel selection.

Example CSI Reporting Enhancements for Unlicensed Comp

As noted, CoMP operations in unlicensed spectrum may depend in part on the gNB(s) obtaining accurate CSI from the UEs. Typically, the gNB(s) may obtain CSI by transmitting downlink CSI-RS, and receiving CSI feedback (from UE(s)) determined based on the downlink CSI-RS. In unlicensed spectrum, the gNB(s) may have to perform a LBT procedure (e.g., by applying CCA before transmitting) in order to win contention-based access to the unlicensed spectrum to transmit the CSI-RS. However, there may be situations in which gNB(s) fail to win contention to the unlicensed spectrum to transmit CSI-RS used to obtain CSI for CoMP transmissions.

Figure 3:
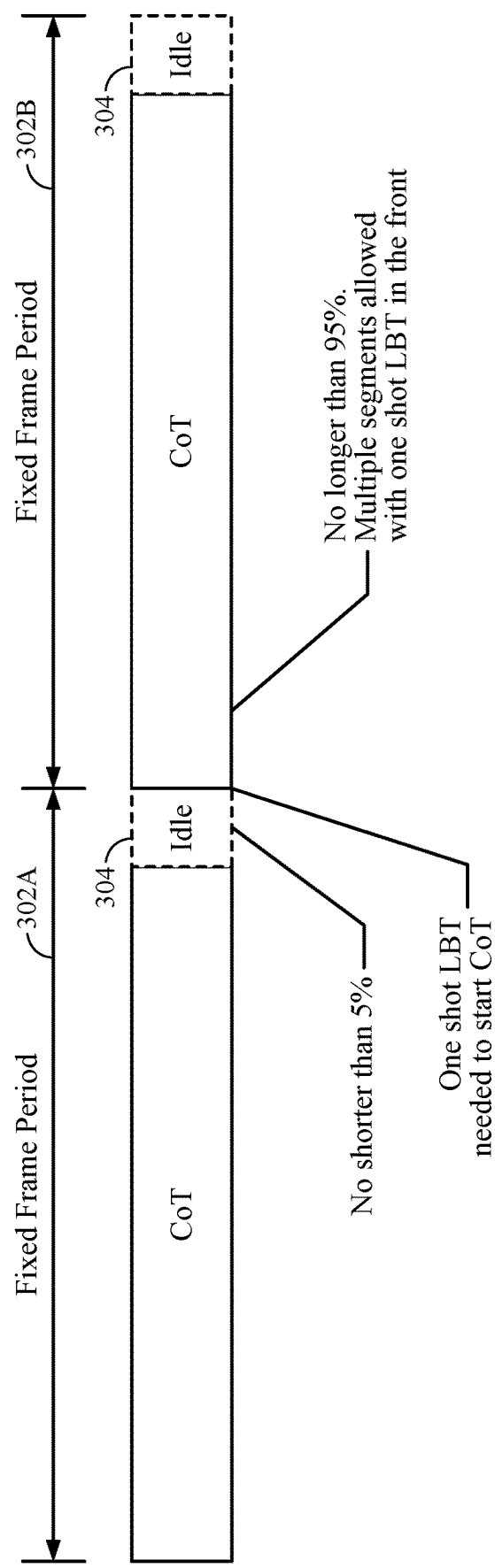
FIG. 3 illustrates an example listen before talk (LBT) mechanism, in accordance with aspects of the present disclosure.

Consider, for example, the scenario in FIG. 3, which depicts an example FBE-based LBT mechanism, according to certain aspects of the present disclosure. In this example, the gNB may perform LBT (e.g., by applying CCA) at the start of each fixed frame period 302, and may transmit in the frame 302 if the LBT procedure is successful (e.g., if the CCA procedure finds that the channel is clear). The gNB may also perform a short LBT in between frames 302A and 302B (e.g., in idle portion 304) to initiate a transmission as long as the gNB transmits at the start of the corresponding frame 302B.

As noted, to ensure high reliability transmission, each UE may be configured to receive transmissions from multiple TRPs/panels/gNBs (collectively referred to as "gNBs" herein), including transmissions of CSI-RS. Each gNB may transmit CSI-RS by performing a synchronized LBT. However, in situations where there is unexpected interference, there may be instances where a subset of the gNBs fail to transmit on the medium (e.g., due to LBT failure). The UE, in turn, may not know how to determine accurate CSI in situations where there is uncertainty about whether each gNB has successfully transmitted a CSI-RS. This can lead to the UE reporting inaccurate CSI, which may impact (e.g., degrade) the performance of CoMP operations.

Aspects presented herein provide techniques that enable a UE to determine whether all gNBs or a subset of gNBs have successfully transmitted a CSI-RS in unlicensed spectrum. Aspects further provide techniques that enable the UE to adjust or modify CSI reporting in cases where a subset of the gNBs has successfully transmitted CSI-RS in unlicensed spectrum. By enabling UEs to modify CSI reporting in such cases, the techniques presented herein can significantly improve the accuracy of CSI for CoMP operations in unlicensed spectrum.

Figure 4:
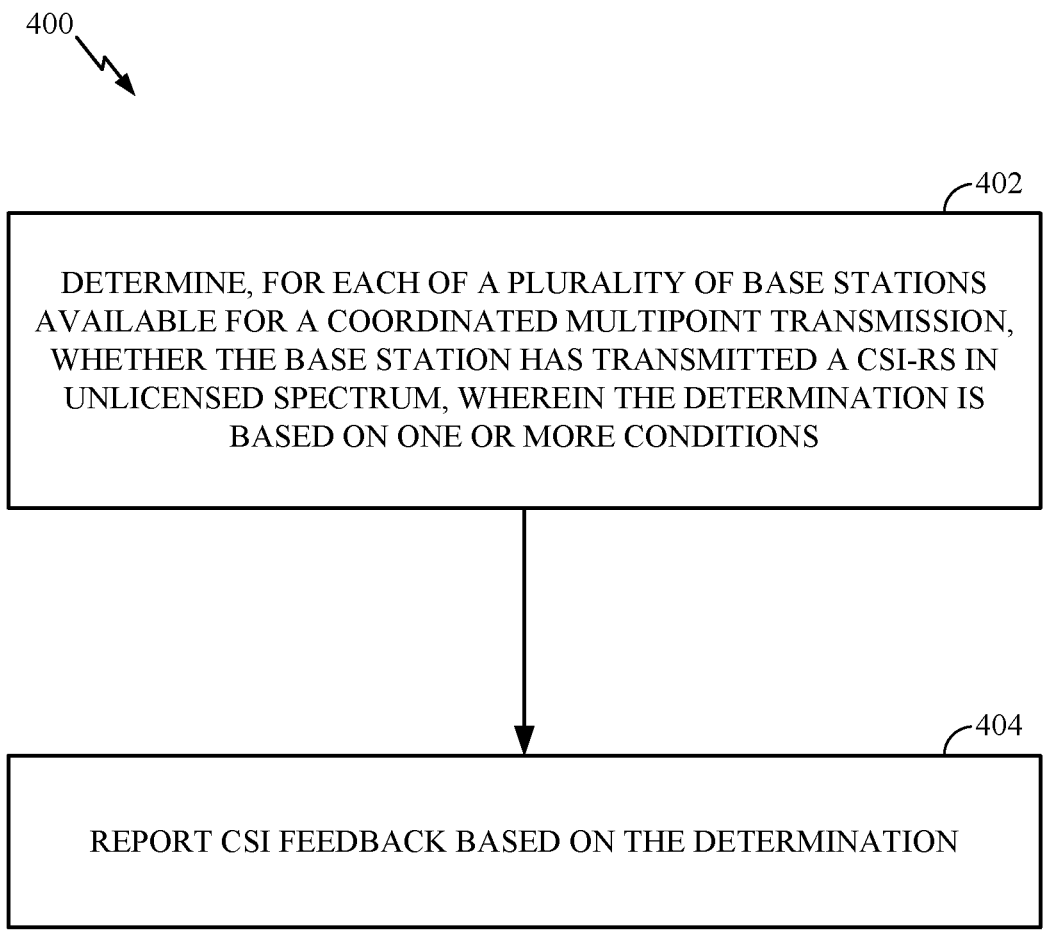
FIG. 4 is a flow diagram illustrating example operations for wireless communications, e.g., for reporting CSI feedback for CoMP operations in unlicensed spectrum, in accordance with certain aspects of the present disclosure.

FIG. 4 illustrates example operations 400 for wireless communications, in accordance with aspects of the present disclosure. Operations 400 may be performed, for example, by a UE (e.g., UE 120 shown in FIG. 1). Operations 400 may be implemented as software components (e.g., reporting component 160) that are executed and run on one or more processors (e.g., processor 280 of FIG. 2). Further, the communicating (e.g., transmission and/or reception of signals) by the UE in operations 400 may be enabled, for example, by one or more antennas (e.g., antennas 252 of FIG. 2). In certain aspects, the communicating (e.g., transmission and/or reception of signals) by the UE may be implemented via a bus interface of one or more processors (e.g., processor 280) obtaining and/or outputting signals.

Operations 400 begin, at 402, where the UE determines, for each of a plurality of BSs (e.g., gNB(s), such as BS(s) 110) available for a CoMP transmission, whether the BS has transmitted a CSI-RS in unlicensed spectrum, wherein the determination is based on one or more conditions. At 404, the UE reports CSI feedback based on the determination.

In some aspects, the one or more conditions (in 402) may include detection of a reference signal on a set of ports configured for the BS. For example, the UE may first detect the presence of CSI-RS transmission before the UE further processes CSI. If the UE determines that the amount of energy of the set of ports is above a threshold, the UE may determine that the BS successfully transmitted a CSI-RS. If the amount of energy is below a threshold, the UE may determine that the base station did not successfully transmit a CSI-RS. The detection of the CSI-RS transmission may be based on a pre-configured signal, such as a phase tracking reference signal (PTRS) or a CSI-RS.

In some cases, however, the reliability of detection of the reference signal of the configured set of ports may be impacted by the portion of bandwidth (or bandwidth part (BWP)) configured for the UE. For example, different UEs may have different BWPs, and, in some cases, the configured bandwidth of the CSI-RS may be different within the BWP. Thus, depending on the bandwidth of the configured BWP, the UE may have different performance of CSI-RS detection.

In some aspects, the one or more conditions (in 402) may include detection of at least one of a control channel or data channel from the BS. For example, if the UE detects a PDCCH or PDSCH in the frame (e.g., from the BS), then the UE may infer that the BS successfully transmitted a CSI-RS in the same frame. In some cases, however, the detection based on PDCCH or PDSCH may be unreliable, given that the UE may not always be scheduled by the BS in every frame.

In some aspects, the UE may receive an indication of at least one set of CSI-RS resources associated with each base station. In these cases, the one or more conditions (in 402)

may include an amount of energy measured on at least one set of CSI-RS resources associated with the BS. For example, the network may indicate to the UE a set of CSI-RS resources or multiple different sets of CSI-RS resources that are transmitted from the same gNB. The UE may combine the energy from the different CSI-RS resources and ports to determine whether each gNB has transmitted in the frame.

In some aspects, the one or more conditions (in 402) may include an indication of at least one set of CSI-RS resources available to the UE for determining the CSI feedback. In some cases, the indication may include a grant received from at least one BS of a subset of the plurality of BSs. For example, the network may indicate via PDCCH from the successful gNBs, the set of CSI-RS resources that are actually available in this frame for measurement (e.g., to determine CSI).

In some aspects, the one or more conditions (in 402) may include an indication of whether each BS has transmitted a CSI-RS in the unlicensed spectrum. For example, the UE may receive (via a common PDCCH, a slot format indication (SFI) PDCCH, a channel occupancy time indication (COTI) PDCCH, etc.) an indication of the success/failure status of LBT from the different gNBs. Based on this indication, the UE may determine the exact CSI-RS present in the frame.

Given the uncertainty of whether each gNB has successfully transmitted a CSI-RS, the UE may have to determine CSI feedback based in part on the outcome of the LBT procedure at each of the gNBs. Aspects presented herein provide techniques for modifying CSI feedback based in part on the gNBs that have successfully transmitted CSI-RS and/or the gNBs that have not successfully transmitted CSI-RS. More specifically, techniques described herein provide a hierarchical CSI codebook and reporting mechanism for UEs.

Figure 5:
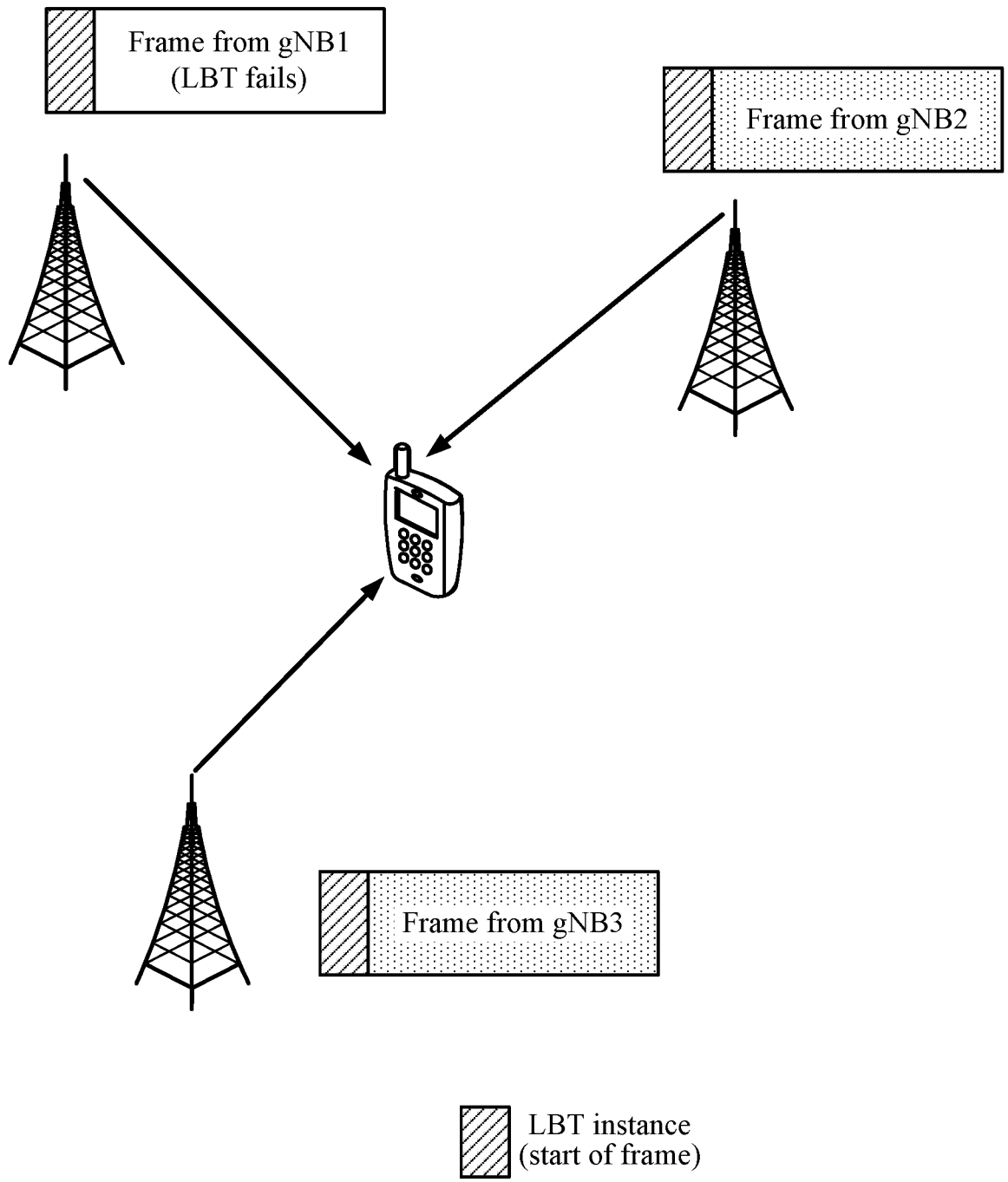
FIG. 5 illustrates an example of LBT-based CSI-RS transmission in a communication network, in accordance with certain aspects of the present disclosure.

Consider, for example, the scenario depicted in FIG. 5 where gNB1 transmits CSI-RS ports 1-4, gNB2 transmits CSI-RS ports 5-8, and gNB3 transmits CSI-RS ports 9-12. Assume that ports 1-2, 5-6, and 9-10 are used for determining the channel information, and ports 3-4, 7-8, and 11-12 are used for determining the interference information. Further assume (as shown) that LBT at gNB1 has not succeeded, and that the UE detects only the CSI-RS transmissions from gNB2 and gNB3.

Given the above reference scenario, in some aspects, the UE may determine (at 404) to skip all CSI reporting related to gNB1. That is, the UE may refrain from reporting first CSI feedback associated with gNB1, and report second CSI feedback associated with gNB2 and gNB3. For example, the UE may generally be configured to report CSI for the following resource combinations: gNB1, gNB2, gNB3, gNB1+gNB2, gNB1+gNB3, gNB2+gNB3, and gNB1+gNB2+gNB3. If the UE determines gNB1 has not transmitted, the UE may skip transmitting CSI for the following resource combinations: gNB1, gNB1+gNB2, gNB1+gNB3, and gNB1+gNB2+gNB3. The UE, however, may still transmit CSI for the remaining resource combinations (e.g., gNB2, gNB3, and gNB2+gNB3). Skipping CSI reporting associated with the unsuccessful gNB may be useful when the gNB has more data to send in the later part of the frame (e.g., retransmission) and can use accurate CSI depending on the actual set of gNBs that cleared LBT. In some cases, the channel for CSI-RS may be filtered by taking into account the success/failure of LBT before computing CSI.

Still referring to the above scenario depicted in FIG. 5, in some aspects, the UE may determine (at 404) to use older channel and interference estimates associated with gNB1, e.g., when reporting CSI feedback. That is, the UE may determine and report CSI feedback associated with gNB1 based on a previous CSI-RS received from gNB1. In some cases, the UE may use the latest available older estimates for the corresponding ports (of gNB1) to determine the overall CSI. Reporting the latest available CSI for the unsuccessful gNB may be useful when gNB(s) prefer to know the overall long term CSI (e.g., for cluster management/network management, etc.).

In some aspects, when either skipping CSI reporting or reporting older channel estimates, it may be assumed that the CSI-RS configuration does not change when some of the gNBs are not available. However, this may not be an optimal solution, as the gNB(s) may prefer more detailed feedback from the existing set of TRPs in case a reduced set of TRPs clear LBT.

Accordingly, in some aspects, the UE may be configured (e.g., at 404) to report periodic CSI using a different reporting configuration when a subset of gNBs do not clear LBT. That is, the UE may use a first reporting configuration to report the CSI feedback if the UE determines that each of the gNBs has transmitted a CSI-RS in the unlicensed spectrum, and use a second reporting configuration to report the CSI feedback if the UE determines that at least one gNB has not transmitted a CSI-RS in unlicensed spectrum. At least one of the gNBs may configure UEs with the desired reporting configuration when some subset of the gNBs fails.

In some aspects, the UE (e.g., at 404) may use a larger set of resources on other (successful) gNBs when one gNB fails. That is, continuing with the above scenario, the first reporting configuration may include a first set of resources allocated for reporting CSI feedback associated with gNB2 and gNB3, and the second reporting configuration may include a larger second set of resources allocated for reporting CSI feedback associated with gNB2 and gNB3.

In some aspects, the UE (e.g., at 404) may use the same set of resources to report CSI feedback for the (successful) gNBs when one gNB fails, but the UE may use a different reporting configuration for the same set of resources. In some aspects, using the second reporting configuration may include changing a reporting format for the CSI feedback associated with the successful gNBs (e.g., gNB2 and gNB3, assuming the above scenario). In one example, a rank 1 restriction on gNB2 and gNB3 may be relaxed to rank 1 and rank 2 reporting, when gNB1 fails LBT. In one example, an "only CQI" reporting restriction for gNB2 and gNB3 may change to "CQI+PMI" reporting, etc. Note, some of the reporting settings may be configured as part of different aperiodic CSI trigger states. In such cases, depending on the LBT outcome, the UE may choose different trigger states even for periodic and semi-periodic reporting without any trigger from the gNB (or with some information about LBT success/failure from the gNB).

In some aspects, the CSI feedback report size may be a function of the set of gNBs that cleared the medium. The gNB, in general, may be able to determine the PUCCH/PUSCH report size, since it knows the exact configuration used by the UE to report CSI. In some cases, however, if the UE mis-detects the RS or PDCCH, which indicates the set of nodes transmitting, then the UL report may be corrupted. In some cases, the gNB may have to blindly try different configurations.

In some aspects, the CSI feedback report may be split into multiple parts. For example, a first portion of the CSI feedback report may include the report format indicating which CSI(s) are being reporting. A second portion of the CSI feedback report may include the exact CSI reports (e.g., indicated in the first portion). The first and second portions of the CSI feedback report may be on different resources (e.g., PUCCH or PUSCH).

Figure 6:
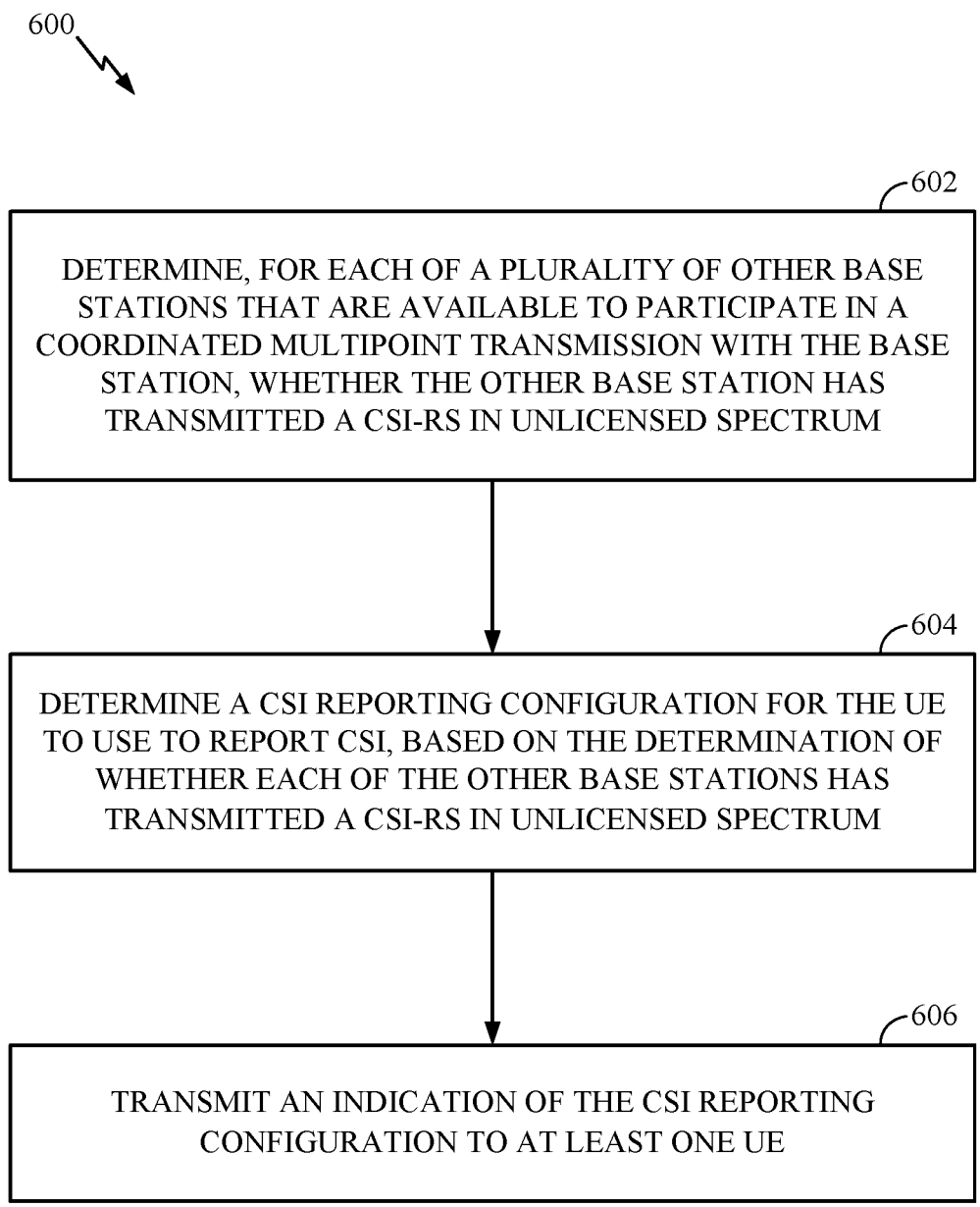
FIG. 6 is a flow diagram illustrating example operations for wireless communications, e.g., for configuring CSI reporting for CoMP operations in unlicensed spectrum, in accordance with certain aspects of the present disclosure.

FIG. 6 illustrates example operations 600 for wireless communications, in accordance with aspects of the present disclosure. Operations 600 may be performed, for example, by a BS (e.g., gNB, such as BS 110 shown in FIG. 1). Operations 600 may be implemented as software components (e.g., reporting configuration component 170) that are executed and run on one or more processors (e.g., processor 280 of FIG. 2). Further, the communicating (e.g., transmission and/or reception of signals) by the UE in operations 600 may be enabled, for example, by one or more antennas (e.g., antennas 252 of FIG. 2). In certain aspects, the communicating (e.g., transmission and/or reception of signals) by the UE may be implemented via a bus interface of one or more processors (e.g., processor 280) obtaining and/or outputting signals.

Operations 600 begin, at 602, where the BS determines, for each of a plurality of other BS(s) that are available to participate in a CoMP transmission with the BS, whether the other BS has successfully transmitted a CSI-RS in unlicensed spectrum. In some aspects, the BS may determine whether the other BS(s) has transmitted a CSI-RS, based on a network listening function at the BS (e.g., the BS detects the CSI-RS via the network listening function).

At 604, the BS determines a CSI reporting configuration for the UE to use to report CSI, based on the determination of whether each of the other BS(s) has successfully transmitted a CSI-RS in unlicensed spectrum. At 606, the BS transmits an indication of the CSI reporting configuration to at least one UE (e.g., UE 120).

In aspects herein, the CSI reporting configuration determined by the BS (e.g., at 604) may be similar to any of the CSI reporting configurations described above that are used by the UE to report CSI in situations where at least one BS has not successfully transmitted a CSI-RS in unlicensed spectrum. For example, in some aspects, the BS (e.g., at 604) can determine a first CSI reporting configuration if the determination is that each of the other BSs has transmitted a CSI-RS in the unlicensed spectrum and determine a second CSI reporting configuration if the determination is at least one of the other BS(s) has not transmitted a CSI-RS in the unlicensed spectrum. In some aspects, the second CSI reporting configuration may indicate that the UE is to either skip CSI reporting or report older channel estimates for the BS(s) that did not successfully transmit a CSI-RS in the unlicensed spectrum. In some aspects, the second CSI reporting configuration may be associated with a larger set of resources compared to the first CSI reporting configuration. In some aspects, the first and second CSI reporting configurations may have different reporting formats (e.g., referring to the scenario depicted in FIG. 5, a rank 1 restriction on gNB2 and gNB3 may be relaxed to rank 1 and rank 2 reporting, when gNB1 fails LBT).

In some aspects, the CSI reporting configuration (e.g., at 604) may indicate the size of the CSI feedback report. For example, the size of the function of the CSI feedback report may be a function of the set of gNBs that cleared the medium. In some aspects, the CSI reporting configuration (e.g., at 604) may indicate that the UE is to transmit different portions of the CSI feedback report on different resources (e.g., PUCCH or PUSCH).

Figure 7:
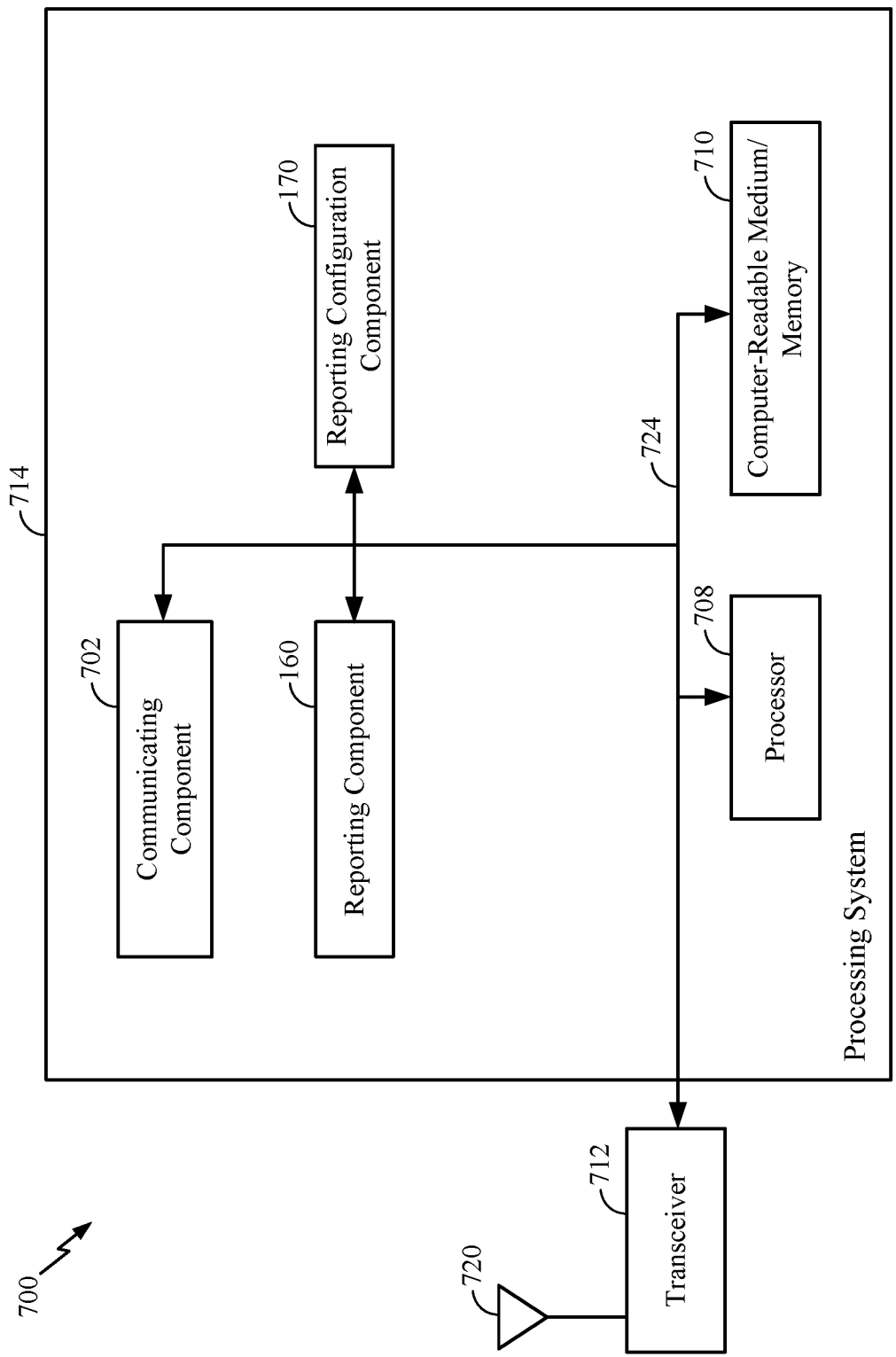
FIG. 7 illustrates a communications device that may include various components configured to perform operations for the techniques disclosed herein in accordance with aspects of the present disclosure.

FIG. 7 illustrates a communications device 700 that may include various components (e.g., corresponding to means-plus-function components) configured to perform operations for the techniques disclosed herein, such as the operations illustrated in FIGS. 4 and 6. The communications device 700 includes a processing system 714 coupled to a transceiver 712. The transceiver 712 is configured to transmit and receive signals for the communications device 700 via an antenna 720, such as the various signals described herein. The processing system 714 may be configured to perform processing functions for the communications device 700, including processing signals received and/or to be transmitted by the communications device 700.

The processing system 714 includes a processor 708 coupled to a computer-readable medium/memory 710 via a bus 724. In certain aspects, the computer-readable medium/memory 710 is configured to store instructions that when executed by processor 708, cause the processor 708 to perform the operations illustrated in FIGS. 4 and 6, and/or other operations for performing the various techniques discussed herein.

In certain aspects, the processing system 714 further includes a communicating component 702 for performing the operations illustrated at 404 in FIG. 4 and the operations illustrated at 606 in FIG. 6. Additionally, the processing system 714 includes a reporting component 160 for performing the operations illustrated at 402 and 404 in FIG. 4. The processing system 714 includes a reporting configuration component 170 for performing the operations illustrated at 602, 604, and 606 in FIG. 6. The communicating component 702, reporting component 160, and reporting configuration component 170 may be coupled to the processor 708 via bus 724. In certain aspects, the communicating component 702, reporting component 160, and reporting configuration component 170 may be hardware circuits. In certain aspects, the communicating component 702, reporting component 160, and reporting configuration component 170 may be software components that are executed and run on processor 708.

EXAMPLE EMBODIMENTS

Embodiment 1

A method for wireless communication by a UE, comprising determining, for each of a plurality of base stations available for a coordinated multipoint (CoMP) transmission, whether the base station has transmitted a channel state information reference signal (CSI-RS) in unlicensed spectrum, wherein the determination is based on one or more conditions, and reporting channel state information (CSI) feedback based on the determination.

Embodiment 2

The method of Embodiment 1, wherein the one or more conditions comprise detection of a reference signal on a set of ports configured for the base station.

Embodiment 3

The method of any of Embodiments 1 or 2, wherein the reference signal comprises a phase tracking reference signal (PTRS) or a CSI-RS.

Embodiment 4

The method of Embodiment 1 to 3, further comprising receiving an indication of at least one set of CSI-RS resources associated with each base station, wherein the one or more conditions comprise an amount of energy measured on the at least one set of CSI-RS resources.

Embodiment 5

The method of any of Embodiments 1 to 4, further comprising receiving an indication of at least one set of CSI-RS resources associated with each base station, wherein the one or more conditions comprise an amount of energy measured on the at least one set of CSI-RS resources.

Embodiment 6

The method of any of Embodiments 1 to 5, wherein the one or more conditions comprise an indication of at least one set of CSI-RS resources available to the UE for determining the CSI feedback.

Embodiment 7

The method of any of Embodiments 1 to 6, wherein the indication comprises a grant received from at least one base station of a subset of the plurality of base stations.

Embodiment 8

The method of any of Embodiments 1 to 7, wherein the one or more conditions comprise an indication of whether each base station has transmitted a CSI-RS in the unlicensed spectrum.

Embodiment 9

The method of any of Embodiments 1 to 8, wherein the indication is received via a physical downlink control channel (PDCCH).

Embodiment 10

The method of any of Embodiments 1 to 9, wherein the determination is that at least one first base station of the plurality of base stations has not transmitted a CSI-RS in the unlicensed spectrum.

Embodiment 11

The method of Embodiment 10, wherein reporting the CSI feedback comprises refraining from reporting first CSI feedback associated with the at least one first base station, and reporting second CSI feedback associated with at least one second base station of the plurality of base stations.

Embodiment 12

The method of Embodiment 10, wherein reporting the CSI feedback comprises determining CSI feedback associated with the at least one first base station based on a previous CSI-RS received from the at least one first base station, and reporting the CSI feedback associated with the at least one first base station that is determined based on the previous CSI-RS.

Embodiment 13

The method of any of Embodiments 1 to 9, wherein reporting the CSI feedback comprises using a first configuration to report the CSI feedback if the determination is that each of the plurality of base stations has transmitted a CSI-RS in the unlicensed spectrum, or using a different second configuration to report the CSI feedback if the determination is that at least one first base station of the plurality of base stations has not transmitted a CSI-RS in the unlicensed spectrum.

Embodiment 14

The method of Embodiment 13, wherein the first configuration comprises a first set of resources allocated for reporting CSI feedback associated with at least one second base station of the plurality of base stations, the second configuration comprises a second set of resources allocated for reporting the CSI feedback associated with the at least one second base station, and the second set of resources is larger than the first set of resources.

Embodiment 15

The method of Embodiment 13, wherein using the second configuration comprises changing a reporting format for the CSI feedback associated with at least one second base station of the plurality of base stations.

Embodiment 16

An apparatus for wireless communication, comprising at least one processor configured to determine, for each of a plurality of base stations available for a coordinated multipoint (CoMP) transmission, whether the base station has transmitted a channel state information reference signal (CSI-RS) in unlicensed spectrum, wherein the determination is based on one or more conditions, a transmitter configured to report channel state information (CSI) feedback based on the determination, and a memory coupled to the at least one processor.

Embodiment 17

A method for wireless communications by a base station, comprising determining, for each of a plurality of other base stations that are available to participate in a coordinated multipoint (CoMP) transmission with the base station, whether the other base station has transmitted a channel state information reference signal (CSI-RS) in unlicensed spectrum, determining a channel state information (CSI) reporting configuration for a user equipment (UE) to use to report CSI, based on the determination of whether each of the other base stations has transmitted a CSI-RS in the unlicensed spectrum, and transmitting an indication of the CSI reporting configuration to the UE.

Embodiment 18

The method of Embodiment 17, wherein the determination of whether the other base station has transmitted a CSI-RS is based on detecting the CSI-RS via a network listening function at the base station.

Embodiment 19

The method of any of Embodiments 17 to 18, wherein determining the CSI reporting configuration comprises determining a first CSI reporting configuration if it is determined that each of the other base stations has transmitted a CSI-RS in the unlicensed spectrum, and determining a second CSI reporting configuration if it is determined that at least one of the other base stations has not transmitted a CSI-RS in the unlicensed spectrum.

Embodiment 20

The method of any of Embodiments 17 to 19, wherein at least one of a size, a reporting format, or allocated resources associated with the first CSI reporting configuration is different than a size, a reporting format, or allocated resources associated with the second CSI reporting configuration.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

In some cases, rather than actually communicating a frame, a device may have an interface to communicate a frame for transmission or reception. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

For example, means for transmitting, means for sending, means for signaling, means for indicating, means for reporting, means for configuring, means for assigning, means for providing, means for retrieving, means for interacting, means for negotiating, means for exchanging, means for communicating, and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for identifying, means for determining, means for reporting, means for negotiating, means for agreeing, means for signaling, means for storing, means for interacting, means for configuring, means for generating, means for assigning, means for providing, means for updating, means for modifying, means for changing, means for selecting, means for performing, means for using, and/or means for applying may comprise one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 4 and 6.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a user equipment (UE), comprising:
   determining, for each of a plurality of base stations available for a coordinated multipoint (CoMP) transmission, whether the base station has transmitted a channel state information reference signal (CSI-RS) in unlicensed spectrum, wherein the determination is based on one or more conditions; and
   reporting channel state information (CSI) feedback based on the determination, comprising:
      using a first CSI reporting configuration to report the CSI feedback when the determination is that each of the plurality of base stations has transmitted a CSI-RS in the unlicensed spectrum; and
      using a second CSI reporting configuration to report the CSI feedback when the determination is that at least one first base station of the plurality of base stations has not transmitted a CSI-RS in the unlicensed spectrum.

2. The method of claim 1, wherein the one or more conditions comprise detection of a reference signal on a set of ports configured for the base station.

3. The method of claim 2, wherein the reference signal comprises a phase tracking reference signal (PTRS) or a CSI-RS.

4. The method of claim 1, further comprising receiving an indication of at least one set of CSI-RS resources associated with each base station, wherein the one or more conditions comprise an amount of energy measured on the at least one set of CSI-RS resources.

5. The method of claim 1, wherein the one or more conditions comprise detection of at least one of a control channel or data channel from the base station.

6. The method of claim 1, wherein the one or more conditions comprise an indication of at least one set of CSI-RS resources available to the UE for determining the CSI feedback.

7. The method of claim 6, wherein the indication comprises a grant received from at least one base station of a subset of the plurality of base stations.

8. The method of claim 1, wherein the one or more conditions comprise an indication of whether each base station has transmitted a CSI-RS in the unlicensed spectrum.

9. The method of claim 8, wherein the indication is received via a physical downlink control channel (PDCCH).

10. The method of claim 1, wherein the determination is that the at least one first base station of the plurality of base stations has not transmitted a CSI-RS in the unlicensed spectrum.

11. The method of claim 10, wherein reporting the CSI feedback comprises:
refraining from reporting first CSI feedback associated with the at least one first base station; and
reporting second CSI feedback associated with at least one second base station of the plurality of base stations.

12. The method of claim 10, wherein reporting the CSI feedback comprises:
determining CSI feedback associated with the at least one first base station based on a previous CSI-RS received from the at least one first base station; and
reporting the CSI feedback associated with the at least one first base station that is determined based on the previous CSI-RS.

13. The method of claim 1, wherein:
the first CSI reporting configuration comprises a first set of resources allocated for reporting CSI feedback associated with at least one second base station of the plurality of base stations;
the second CSI reporting configuration comprises a second set of resources allocated for reporting the CSI feedback associated with the at least one second base station; and
the second set of resources is larger than the first set of resources.

14. The method of claim 1, wherein using the second CSI reporting configuration comprises changing a reporting format for the CSI feedback associated with at least one second base station of the plurality of base stations.

15. An apparatus for wireless communication, comprising:
at least one processor configured to determine, for each of a plurality of base stations available for a coordinated multipoint (CoMP) transmission, whether the base station has transmitted a channel state information reference signal (CSI-RS) in unlicensed spectrum, wherein the determination is based on one or more conditions;
a transmitter configured to report channel state information (CSI) feedback based on the determination, wherein reporting the CSI feedback comprises:
using a first CSI reporting configuration to report the CSI feedback when the determination is that each of the plurality of base stations has transmitted a CSI-RS in the unlicensed spectrum; and
using a second CSI reporting configuration to report the CSI feedback when the determination is that at least one first base station of the plurality of base stations has not transmitted a CSI-RS in the unlicensed spectrum; and
a memory coupled to the at least one processor.

16. The apparatus of claim 15, wherein:
the first CSI reporting configuration comprises a first set of resources allocated for reporting CSI feedback associated with at least one second base station of the plurality of base stations;
the second CSI reporting configuration comprises a second set of resources allocated for reporting the CSI feedback associated with the at least one second base station; and
the second set of resources is larger than the first set of resources.

17. A method for wireless communications by a base station, comprising:
determining, for each of a plurality of other base stations that are available to participate in a coordinated multipoint (CoMP) transmission with the base station, whether the other base station has transmitted a channel state information reference signal (CSI-RS) in unlicensed spectrum;
determining a channel state information (CSI) reporting configuration for a user equipment (UE) to use to report CSI, based on the determination of whether each of the other base stations has transmitted a CSI-RS in the unlicensed spectrum; and
transmitting an indication of the CSI reporting configuration to the UE.

18. The method of claim 17, wherein the determination of whether the other base station has transmitted a CSI-RS is based on detecting the CSI-RS via a network listening function at the base station.

19. The method of claim 17, wherein determining the CSI reporting configuration comprises:
determining a first CSI reporting configuration if it is determined that each of the other base stations has transmitted a CSI-RS in the unlicensed spectrum; and
determining a second CSI reporting configuration if it is determined that at least one of the other base stations has not transmitted a CSI-RS in the unlicensed spectrum.

20. The method of claim 19, wherein at least one of a size, a reporting format, or allocated resources associated with the first CSI reporting configuration is different than a size, a reporting format, or allocated resources associated with the second CSI reporting configuration.

* * * * *